(12) United States Patent
Moscoso

(10) Patent No.: US 9,133,037 B2
(45) Date of Patent: Sep. 15, 2015

(54) PROCESSES FOR MAKING NANO ZEOLITES AND FOR RECOVERY OF NANO ZEOLITES FROM AN AQUEOUS SUSPENSION

(75) Inventor: Jaime G. Moscoso, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 540 days.

(21) Appl. No.: 12/909,643

(22) Filed: Oct. 21, 2010

(65) Prior Publication Data

US 2012/0100066 A1    Apr. 26, 2012

(51) Int. Cl.
| | | |
|---|---|---|
| C01B 33/36 | (2006.01) | |
| C01B 39/08 | (2006.01) | |
| B01J 29/70 | (2006.01) | |
| B01J 29/84 | (2006.01) | |

(52) U.S. Cl.
   CPC .............. *C01B 39/082* (2013.01); *B01J 29/70* (2013.01); *B01J 29/84* (2013.01)

(58) Field of Classification Search
   CPC ...... C01B 39/02; C01B 39/026; B01J 20/186; B01J 29/70; B01J 29/084
   See application file for complete search history.

(56) References Cited

U.S. PATENT DOCUMENTS

| | | | | |
|---|---|---|---|---|
| 3,157,466 | A * | 11/1964 | Ruth | 423/396 |
| 4,164,551 | A | 8/1979 | Elliott, Jr. | |
| 4,703,025 | A | 10/1987 | Kokotailo et al. | |
| 2002/0113015 | A1 | 8/2002 | Carati et al. | |
| 2007/0071666 | A1 * | 3/2007 | Larsen et al. | 423/351 |
| 2007/0224113 | A1 | 9/2007 | Willis et al. | |
| 2009/0272674 | A1 | 11/2009 | Zheng et al. | |

FOREIGN PATENT DOCUMENTS

| | | | |
|---|---|---|---|
| CN | 101406847 | * | 4/2009 |
| CN | 101406847 | A | 4/2009 |
| EP | 1679286 | A1 | 7/2006 |
| WO | 9308125 | | 4/1993 |
| WO | 9703019 | | 1/1997 |
| WO | 9703020 | | 1/1997 |
| WO | 2005123587 | A2 | 12/2005 |
| WO | 2008058398 | A1 | 5/2008 |

* cited by examiner

*Primary Examiner* — Bijay Saha

(57) ABSTRACT

Embodiments of a process for recovery of nano zeolites from an aqueous suspension are provided. The process comprises the steps of applying centrifugal force to the aqueous suspension to separate a supernatant phase from a solid phase that comprises the nano zeolites and residuals. The solid phase is contacted with a solution effective to dissolve or digest the residuals and to agglomerate the nano zeolites forming agglomerated nano zeolites. The solution is filtered to recover the agglomerated nano zeolites.

12 Claims, 1 Drawing Sheet

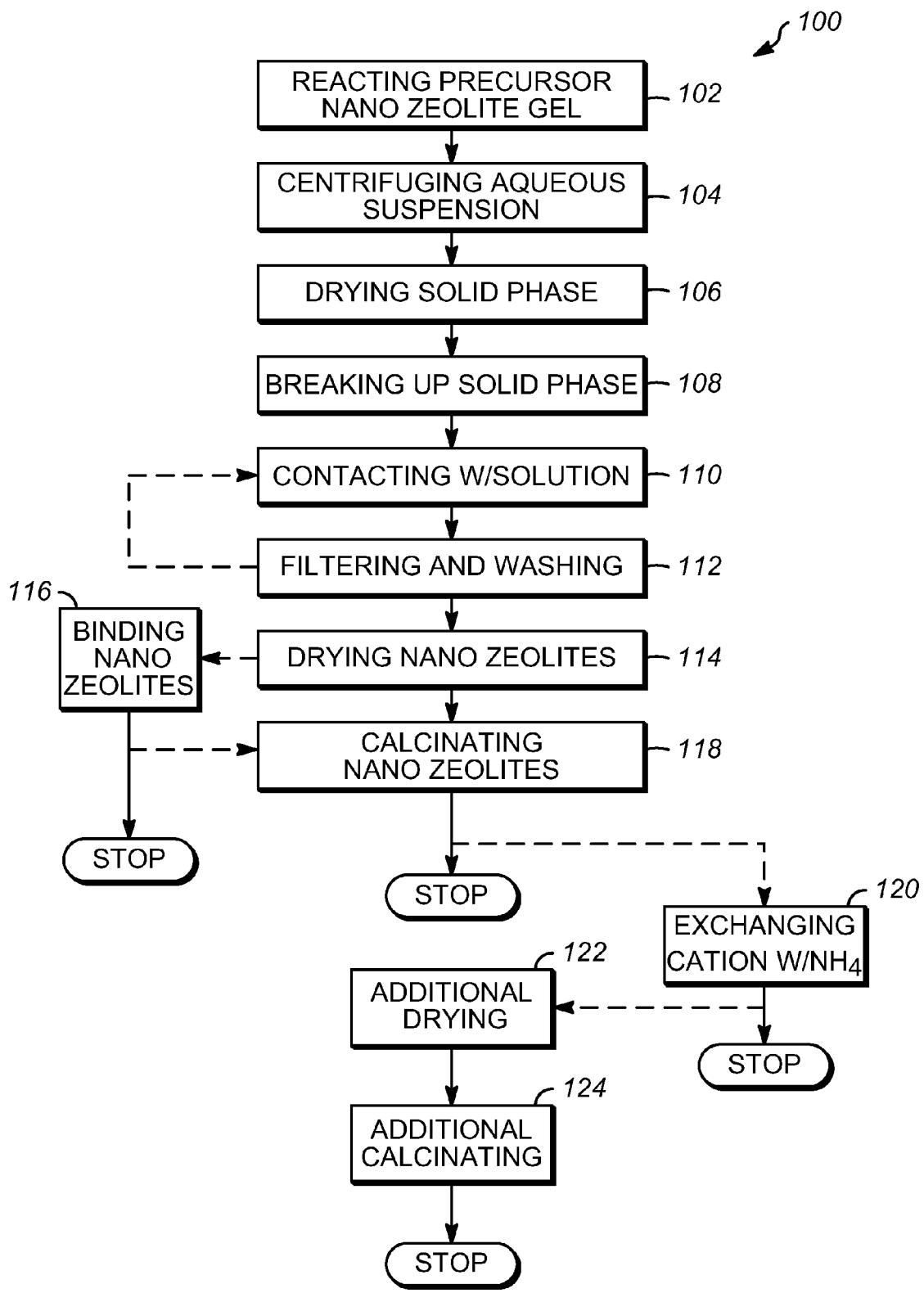

PROCESSES FOR MAKING NANO ZEOLITES AND FOR RECOVERY OF NANO ZEOLITES FROM AN AQUEOUS SUSPENSION

FIELD OF THE INVENTION

The present invention relates generally to nano zeolites and their preparation, and more particularly relates to processes for making nano zeolites and for recovery of nano zeolites from an aqueous suspension used to prepare the nano zeolites.

BACKGROUND OF THE INVENTION

Zeolites generally are aluminosilicate oxide structures that have well-defined pore structures due to a high degree of crystallinity. Crystalline aluminosilicate zeolites can comprise both natural and synthetic aluminosilicates. Crystalline aluminosilicate zeolites include those having aluminosilicate cage structures in which alumina and silica tetrahedra are intimately connected with each other in an open three dimensional crystalline network. The tetrahedra are cross linked by the sharing of oxygen atoms, with spaces between the tetrahedra occupied by water molecules prior to partial or total dehydration of the zeolite. Dehydration results in crystals interlaced with channels having molecular dimensions. In a hydrated form, the crystalline aluminosilicate zeolites are generally represented by the formula, $M_{2/n}O:Al_2O_3:wSiO_2:yH_2O$, where "M" is a cation that balances the electrovalence of the tetrahedra and is generally referred to as an exchangeable cationic site, "n" represents the valence of the cation, "w" represents the moles of $SiO_2$, and "y" represents the moles of water. The exact structure type aluminosilicate zeolite is generally identified by the particular silica, alumina molar ratio ($SiO_2/Al_2O_3$) and the pore dimensions of the cage structures. Cations (M) occupying exchangeable cationic sites in the zeolite may be replaced with other cations by ion exchange methods well known to those having ordinary skill in the field of crystalline aluminosilicates.

Zeolite crystalline particles may be formed from zeolite fine powder mixed with a binder. The binder may be an amorphous inorganic material, such as silica, alumina or certain clays and mixtures thereof "Formed zeolites" may be extrudates, tablets, oil drops, microspheres, spheres, such as beads, or the like. The zeolites may be formed by oil-dropping, spray-drying, extrusion, or other "forming" techniques.

Recently, nanosized zeolites or nano zeolites (less than about 300 nm) have attracted considerable attention because of their potential advantages in catalysis due to their high external surface area, reduced diffusion path lengths and exposed active sites. The reduction of particle size from the micrometer to the nanometer scale leads to substantial changes in the properties of materials, which have an impact on the performance of zeolites in traditional application areas such as catalysis and separation. The ratio of external to internal number of atoms increases rapidly as the particle sizes decrease. Additionally, the nano zeolite crystals have reduced diffusion path lengths relative to conventional micrometer-sized zeolites.

Nano zeolites are typically formed by crystallizing (e.g. reacting) a gel that comprises a source of silica and alumina, sodium hydroxide, a structure directing agent also known as a template, and water at temperatures of about 100° C., for example. In general, the nano zeolite formation reaction typically requires a substantial excess of silica, alumina and sodium hydroxide that remain in the crystallization aqueous suspension, also known as "mother liquor", in various forms (e.g. residuals comprising unreacted components, salts, etc.) together with the crystallized nano zeolites. Because of the nano-size of the nano zeolites, it is often difficult, expensive and time-consuming to remove the nano zeolites from the mother liquor including separating them from the residuals. Conventional filtration methods for separation are impractical due to the nano size of these particles. Rather, costly high speed commercial centrifuges operating at from about 50,000 to about 125,000 revolutions per minute (RPM), for example, are used for the separation process. A high speed centrifugal force is applied to the mother liquor which separates into a supernatant phase and a solid phase. The solid phase, which contains the nano zeolites and the residuals, is collected and incorporated into a liquid wash medium and the combination is again subjected to high speed centrifugal force to remove a portion of the residuals in the liquid wash. This process is repeated many times, unfortunately often over the course of several days or weeks, until the residuals have been substantially removed leaving primarily the nano zeolites. Thus, preparation and recovery of nano zeolites is very time consuming and expensive.

Accordingly, it is desirable to provide a more efficient process for recovery of the nano zeolites from the mother liquor which is less time consuming and does not require the use of costly high-speed commercial centrifuges. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Processes for recovery of nano zeolites from an aqueous suspension are provided herein. In accordance with an exemplary embodiment, a process for recovery of nano zeolites from an aqueous suspension is provided. The process comprises the steps of applying centrifugal force to the aqueous suspension to separate a supernatant phase from a solid phase that comprises the nano zeolites and residuals. The solid phase is contacted with a solution effective to dissolve or digest the residuals and to agglomerate the nano zeolites forming agglomerated nano zeolites. The solution is filtered to recover the agglomerated nano zeolites.

In accordance with another exemplary embodiment, a process for making nano zeolites comprises the steps of reacting a gel comprising silica, alumina, sodium hydroxide, water and a template to form an aqueous suspension comprising the nano zeolites and residuals. Centrifugal force is applied to the aqueous suspension to separate a supernatant phase from a solid phase that comprises the nano zeolites and the residuals. The supernatant phase is removed and the solid phase is dried. A solid powder phase is formed by breaking up the solid phase. The solid powder phase is contacted with a solution effective to dissolve or digest the residuals and to agglomerate the nano zeolites forming agglomerated nano zeolites. The solution is filtered to recover the agglomerated nano zeolites and the agglomerated nano zeolites are washed to form washed agglomerated nano zeolites. The washed agglomerated nano zeolites are then dried to form dried nano zeolites.

BRIEF DESCRIPTION OF THE DRAWINGS

The present invention will hereinafter be described in conjunction with the following drawing FIGURE, wherein like numerals denote like elements, and wherein:

FIG. 1 is a flowchart of a process for making nano zeolites in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

The various embodiments contemplated herein relate to processes for making nano zeolites including recovery of nano zeolites from an aqueous suspension also referred to as "mother liquor". The processes preferably allows separation and recovery of the nano zeolites from a mother liquor and the residuals contained therein within a relatively short timeframe of from about one hour or less for about a 200 g sample of nano zeolites, and about a day or less for about a 2000 pound sample of nano zeolites without requiring the use of a costly high-speed commercial centrifuge. (As used herein, the term "about" means within typical processing tolerances). The residuals comprise, for example, unreacted silica, unreacted alumina, various silica salts, various sodium salts, sodium hydroxide, sodium silicates, sodium aluminates, and mixtures thereof. The process comprises centrifuging the mother liquor preferably at a speed of from about 3000 to about 10,000 RPM, which may be performed by a typical small-scale lab centrifuge. Centrifuging of the mother liquor separates it into a solid phase and a supernatant phase often within a matter of minutes depending upon the sample size. The solid phase comprises the nano zeolites and residuals. The solid phase is collected and preferably broken up via grinding, milling, pulverizing, etc. into a fine powder. The fine powder is contacted with a solution that is effective to dissolve or digest the residuals, and agglomerate the nano zeolites into larger agglomerated particle that are suitable for filtration. The solution is then filtered, in an exemplary embodiment within a matter of minutes, to recover the agglomerated nano zeolites, and to wash away the liquid that contains the residuals. If desired, the agglomerated nano zeolites may again be contacted with the solution to dissolve or digest any remaining residuals and to further agglomerate the nano zeolites for subsequent filtering and washing. The contacting, filtering and washing steps may be repeated several times as desired to obtain a higher purity nano zeolite sample.

The inventor has found that by collecting the centrifuged nano zeolites with the residuals in the solid phase and then dissolving and/or digesting the residuals and agglomerating the nano zeolites with a relatively dilute aqueous solution of $NH_4NO_3$, $NH_4Cl$, and/or $NH_4OH$ for example, the nano zeolites particles increase in size from about less than 300 nm to about 20 µm or greater, which is sufficiently large to be readily collected on commercially available filter paper. Accordingly, the time needed to recover the nano zeolites from the mother liquor including separating them from the residuals is efficiently reduced over conventional processes for recovering nano zeolites. Moreover, the equipment used for recovery can be relatively inexpensive and as simple as a conventional lab scale centrifuge and filtering arrangement using commercially available filter paper.

Referring to FIG. 1, a flowchart of an exemplary process generally depicted as 100 for making nano zeolites is provided. According to exemplary embodiments of the present invention, the nano zeolites prepared by the process 100 have an ammonium-form, a hydrogen-form, or a sodium-form comprising a crystalline aluminosilicate nano zeolite having a porous oxide structure with a well-defined pore structure due to the high degree of crystallinity. Suitable exemplary nano zeolites include those having structure type MFI (e.g., ZSM-5; U.S. Pat. No. 3,702,886), FAU (e.g., Zeolites X; U.S. Pat. No. 2,882,244 and Y; U.S. Pat. No. 3,130,007), and BETA. Additionally, suitable exemplary nano zeolites include UZM nano zeolites available from UOP LLC (Des Plaines, Ill. (USA)) and covered under one or more of the following U.S. patents or published applications: U.S. Pat. Nos. 6,419,895, 6,613,302, 6,776,975, 6,713,041, 6,756,030, 7,344,694, 6,752,980, 6,982,074, 6,890,511, 7,575,737, US 2008-0170987, and US 2008-0031810. The zeolite structure types are described in "*Atlas of Zeolite Structure Types*", W. M. Meier, D. H. Olson and C. Baerlocher, 5$^{th}$ revised edition, 2001, Elsevier. The nano zeolites have ion exchangeable sites within and on the surface of the nano zeolite. Sodium occupies ion exchangeable sites within and on the surface of the "sodium-form nano zeolite", ammonium ($NH_4$) occupies ion exchangeable sites within and on the surface of the "ammonium-form nano zeolite" (or "$NH_4$-nano zeolite"), and hydrogen occupies the ion exchangeable sites within and on the surface of the "hydrogen-form nano zeolite", each in the range of about 0.1% to about 10% by weight of the nano zeolite.

The process 100 comprises crystallizing or reacting a precursor nano zeolite gel (step 102). The gel is a silica-alumina gel composition which may be formed from an alumina source such as sodium aluminate, Boehmite, aluminum alkoxides such as aluminium-isopropyloxide, aluminum sec-butoxide, aluminum trihydroxide, or the like and a silica source such as sodium silicate, alkyl silicates such as tetraethyl orthosilicate and the like and silica sources known under the trademarks and names Ludox®, Ultrasil®, Hysil, or the like. Other aluminosilicates such as kaolin may be used as well. The alumina and silica can be dissolved with a template as is known in the art in a basic environment, such as, for example, a sodium hydroxide aqueous solution. The template is used to direct the formation of specific zeolite topologic framework structures. Some common structure directing agents or templates include organo ammonium cations selected from quaternary ammonium cations, protonated amines, diquaternary ammonium, etc. In one exemplary embodiment, the gel is crystallized in a reactor at a temperature of from about 70 to about 300° C., preferably from about 75 to about 200° C., and most preferably from about 100 to about 125° C. Under these conditions, the gel may take up to several days (e.g. about 2-5 days) to fully crystallize and form the nano zeolites in the aqueous "mother liquor" suspension. After crystallization, the nano zeolite formed from the above described composition of gel is a sodium-form nano zeolite. Other suitable gel compositions known to those skilled in the art may also be used.

Next, the aqueous suspension is centrifuged (step 104). In one exemplary embodiment, the aqueous suspension is centrifuged at a rate of about 3000 RPM or greater, preferably from about 3000 to 10,000 RPM, and more preferably from about 4000 to 8000 RPM. The aqueous suspension is centrifuged for a time of from about 1 to about 60 minutes, preferably from about 1 to about 30 minutes, and more preferably from about 2 to about 10 minutes for an aqueous suspension sample size of from about 100 mL to about 2 L. Larger aqueous suspension sample sizes may require longer centrifuging time depending upon the centrifuging rate used.

The aqueous suspension is separated by the centrifugal force into a supernatant phase and a solid phase. In one example, the solid phase is made up of relatively large pieces of solid material comprising the nano zeolites and residuals.

The residuals are selected from the group consisting of silica, alumina, silica salts, sodium salts, sodium hydroxide, sodium silicates, sodium aluminates, and mixtures thereof.

The supernatant phase is removed and the solid phase is collected. The solid phase is dried (step 106) preferably at a temperature of from about 20 to about 100° C., and more preferably from about 50 to about 100° C., for a time of preferably from about 1 to about 24 hours. In one example, the solid phase is dried so that the water content does not exceed about 50% Loss of Ignition (hereinafter "LOI") at 900° C. The LOI test is described in UOP Test Method No. UOP954-03 (available through ASTM International, 100 Barr Harbor Drive, P.O. Box C700, West Conshohocken, Pa., 19428-2959 USA.

In one exemplary embodiment, the dried solid phase is broken up (step 108) to form a solid powder phase. The solid phase may be broken up via grinding, milling and/or pulverizing. In one example, the solid phase is ground using a mortar and pestle. The time needed for breaking up of the solid pieces will depend on the sample size of the solid phase, but it is envisioned that this process can be accomplished in a matter of minutes using conventional grinding, milling and/or pulverizing equipment known to those skilled in the art. It is believed that the breaking up of the solid phase into a solid powder phase increases the exposed surface area of the nano zeolites and the residuals. Having the nano zeolites broken up into a fine powder is a preferred form of the nano zeolites for the subsequent contacting step (step 110) discussed below. Other suitable means for breaking up the solid phase into a fine powder known to those skilled in the art may also be used.

The solid powder phase is contacted with a solution (step 110) that dissolves or digests the residuals and is effective to agglomerate the nano zeolites to form larger agglomerated nano zeolite particles. Preferably, the agglomerated nano zeolites have a size of about 20 μm or greater, and more preferably of about 25 μm or greater. In one exemplary embodiment, the solution is an aqueous solution comprising a solute selected from the group consisting of $NH_4NO_3$, $NH_4Cl$, $NH_4OH$, and mixtures thereof. The aqueous solution is relatively dilute having a solute concentration of from about 0.05 to about 1.5M, preferably of from about 0.05 to about 0.50, and more preferably of from about 0.05 to about 0.2M, such that the agglomerated nano zeolites undergo little to no ion exchange during the step. In one example, the solution has a pH of from about 8 to about 10. The inventor has found that under certain conditions, if the solution's pH is strongly basic (e.g. greater than about 10) then the silica and/or the alumina may not fully dissolve or digest in the solution. The solid powder phase is contacted with the solution at a temperature of from about 25 to about 80° C., preferably of from about 50 to about 80° C., for a time of from about 0.5 to about 2.0 hours. Other suitable solutions and conditions that dissolve and/or digest the residuals and are effective to agglomerate the nano zeolites may also be used.

In an exemplary embodiment, the solution is filtered (step 112) to recover the agglomerated nano zeolites, which may be washed during filtering or thereafter preferably with water or other suitable solvent to rinse the solution and residuals away from the agglomerated nano zeolites. Preferably, a substantial portion of the residuals are carried away in the filtered wash. In one example, commercially available filter paper having a particle retention rating suitable for capturing the agglomerated nano zeolites is used. One such suitable filter paper is Whatman® 541 which is manufactured by Whatman Corporation of Piscataway, N.J. The Whatman® 541 filter paper has a particle retention rating of from about 20 to about 25 μm with 98% particle capturing efficiency. Other suitable filtering media and filtering devices known to those skilled in the art may also be used.

The contacting, filtering and washing steps (steps 110 and 112) may be repeated if desired. The inventor has found that by repeating these steps (steps 110 and 112) more residuals may be removed from the agglomerated nano zeolites thereby decreasing the level of impurities in the sample. In one example, the steps (steps 110 and 112) are repeated two or more additional times for a total of three or more times to increase the purity of the nano zeolite sample.

The agglomerated nano zeolites are then dried (step 114) to form dried nano zeolites. Drying may be performed at temperatures of from about 60 to about 200° C. The drying time ranges from about 1 to about 24 hours. After drying, the water content of the dried nano zeolites may be about 2% to about 25% LOI at 900° C., preferably about 7% LOI at 900° C.

Optionally, nano zeolite crystalline particles may be formed from the dried nano zeolites by mixing with an inert binder (step 116). The binder may be an amorphous inorganic material, such as silica, alumina, aluminophosphate (ALPO) binder or certain clays and mixtures thereof The formed or bound nano zeolites may be prepared into extrudates by forming methods well known in the art. The extrudates may be comprised of from about 35 to about 90 wt. % of powdered nano zeolites and about 10 to about 65 wt. % of the inert binder (on a volatile-free basis). The preferred binder concentration comprises about 10 to about 50 wt. % of the dried nano zeolites. While formed nano zeolites in the form of extrudates have been described, the invention is not so limited. The nano zeolite powder may be formed with the inert binder into beads, tablets, macrospheres, extrudates, oil drops, microspheres, and spheres such as beads or the like.

The dried nano zeolites are calcinated (step 118) to form dried and calcinated nano zeolites. Calcination is performed at temperatures of from about 400 to about 600° C., preferably about 550° C., under inert atmosphere and/or air using a heating rate of about 1 to about 10° C./minute, preferably about 2° C./minute for about 1 to about 24 hours, preferably about 4 hours, followed by cooling. Calcinating the dried nano zeolites preferably removes organics if present, such as, for example, remaining organic portions from the templates.

In an exemplary embodiment, the dried and calcinated nano zeolites are in the sodium-form. When in the sodium-form, further processing may be done to form a hydrogen-form of the nano zeolites. The sodium-form of the dried and calcinated nano zeolites are thus ion exchanged with ammonium (step 120). In this regard, the sodium-form of the dried and calcinated nano zeolites are exposed to an ammonium-comprising solution, such as, for example, a $NH_4NO_3$ solution, for ion-exchange to produce the $NH_4$-form of nano zeolites. In a preferred embodiment, substantially all of the ion-exchangeable Na sites of the dried and calcinated nano zeolites are exchanged with $NH_4$ such that the weight percent of Na in the $NH_4$-form of the nano zeolites preferably is less than about 0.01% (on a volatile free basis).

The ammonium-form of the dried and calcinated treated nano zeolites from step 120 may then be subjected to an additional drying step (step 122) and then an additional calcinating step (step 124) to form the hydrogen-form of the nano zeolite. The additional drying and calcinating steps (steps 122 and 124) are performed in the same manner as the drying and calcinating steps (steps 114 and 118) previously discussed.

EXAMPLE

The following is an example of the preparation of nano zeolites in accordance with an exemplary embodiment of the present invention. The example is provided for illustration purposes only, and is not meant to limit the various embodiments of the present invention in any way.

Preparation of the Gel:

For preparing the gel, about 39.90 grams (g) of sodium hydroxide was dissolved in about 65 g of de-ionized water. About 13.17 g of gallium oxide and about 2.73 g of aluminum hydroxide were added to the solution to form a slurry. The slurry was loaded in a Teflon bottle which was placed in an oven that was at a temperature of about 99° C. for a time of about 2 hours, yielding a clear liquid of sodium aluminagallate. About 842 g of Ludox® AS-40 colloidal silica, available from W.R. Grace & Co., located in Columbia, Md., was added to a beaker with about 138.4 g of tetrapropyl ammonium bromide solution (50%). The colloidal silica started to gel and make a thick paste. The sodium aluminagallate solution was added to the thick paste with about 300 g of water to form a gel that was mixed for about 20 minutes. The gel had the following composition: 4.35 $Na_2O$: 0.12 $Al_2O_3$: 48 $SiO_2$: 0.6 $Ga_2O_3$: 2.2 TPABr: 450 $H_2O$.

The gel was transferred to a 2 L stir reactor and was heated to about 125° C. The gel was stirred in the reactor at a rate of about 500 RPM and crystallized over period of about 72 hours to yield an aqueous milky liquid (mother liquor and nano zeolites) containing a suspension of nano zeolites and residuals.

Recovery of the Nano Zeolites:

The milky liquid was centrifuged at about 4200 RPM for about 25 minutes using a Beckman Alegra® centrifuge, manufactured by Beckman Coulter Company, located in Brea, Calif. The centrifugal force separated the milky liquid into a supernatant phase and a solid phase that had relatively large solid pieces. The supernatant phase was discarded and the solid phase was dried at about room temperature overnight. The dried sample was then broken up or ground for about 2 minutes using a mortar and pestle to form a fine powder. The powder was then contacted with an aqueous solution having a concentration of about 0.1M of $NH_4NO_3$ which dissolved a portion of the residue and agglomerated the nano zeolites. The solution was filtered using a flask and a funnel with Whatman® filter paper No. 541. The filter paper captured the agglomerated nano zeolites that were then rinsed on the filter paper with deionized water. The contacting, filtering and washing steps were repeated for a total of 3 times to remove any additional residuals from the powder. The agglomerated nano zeolites were dried, which substantially de-agglomerated the nano zeolites, and analyzed by XRD, ICP and SEM. The analysis indicated that the nano zeolites had a sodium-form with an MFI structure that was about 0.28% Al, about 44.3% Si, about 3.26% Ga and about 0.56% Na. The nano zeolites were found to be discreet, small crystals having a size between about 20 to about 50 nm.

Calcinating and Ion Exchange:

The nano zeolites were calcinated at about 560° C. for about 12 hours in nitrogen and air with a heating rate of about 3° C./min. The calcinated nano zeolites were then contacted with a 1.5M aqueous solution of $NH_4NO_3$ at about 75° C. for about 2 hours to produce the ammonium form of nano zeolites, which were subsequently calcinated to produce the hydrogen-form of the nano zeolites. The sample was then washed and dried at about 100° C., and was subsequently calcinated to produce the hydrogen-form of the nano zeolites. The nano zeolites were found to have a surface area of 369 $m^2$/g and a micropore volume of about 0.155 cc/g.

Accordingly, processes for making nano zeolites including recovery of nano zeolites from an aqueous suspension have been described. The various embodiments of the processes comprise applying centrifugal force to the aqueous suspension to separate a supernatant phase from a solid phase that comprises the nano zeolites and residuals. The solid phase is contacted with a solution effective to dissolve and/or digest the residuals and to agglomerate the nano zeolites to form larger agglomerated particles. The solution is then filtered to recover the larger agglomerated nano zeolite particles that are washed with a rinse solvent. If desired, the contacting, filtering and washing steps may be repeated to remove any remaining residuals and to increase the purity of the sample. By collecting the centrifuged nano zeolites with the residuals in the solid phase and then dissolving and/or digesting the residuals and agglomerating the nano zeolites with the solution, the nano zeolite particles increase in size from about less than 300 nm to about 20 µm or greater, which is sufficiently large to be readily collected on commercially available filter paper. Thus, the time and expense required for recovering the nano zeolites from the mother liquor may be substantially reduced over current methods, which often require weeks for such recovery using repeated washing and high-speed centrifuging of the nano zeolites with costly high-speed commercial centrifuges.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A process for recovery of nano zeolites from an aqueous suspension, the process comprising the steps of:
    applying centrifugal force to the aqueous suspension to separate a supernatant phase from a solid phase that comprises the nano zeolites and residuals;
    contacting the solid phase with little or no ion exchange with an aquenous solution comprising a solute selected from the group consisting of $NH_4NO_3$, $NH_4Cl$, $NH_4OH$, and mixtures thereof effective to dissolve or digest the residuals and to agglomerate the nano zeolites forming agglomerated nano zeolites wherein said contacting is for 0.5 to 2.0 hours; and
    filtering the solution to recover the agglomerated nano zeolites.

2. The process according to claim 1, wherein the step of applying centrifugal force comprises centrifuging the aqueous suspension at a rate of about 10,000 RPM or less for a time of about 30 minutes or less.

3. The process according to claim 1, wherein the step of contacting comprises contacting the solid phase with an aqueous solution having a solute concentration of from about 0.05 to about 0.5M.

4. The process according to claim 1, wherein the step of contacting comprises contacting the solid phase with the solution having a pH of from about 8 to about 10.

5. The process according to claim 1, wherein the step of contacting comprises contacting the solid phase with the solution at a temperature of from about 25 to about 80° C.

6. The process according to claim 1, wherein the step of filtering further comprises washing the agglomerated nano zeolites.

7. The process according to claim 6, further comprising repeating the steps of contacting, filtering and washing.

8. The process according to claim 1, further comprising the steps of drying and breaking up the solid phase prior to the step of contacting.

9. The process according to claim 8, wherein the step of drying comprises drying the solid phase at a temperature of from about 20 to about 100° C.

10. The process according to claim 8, wherein the step of drying comprises drying the solid phase for a time of from about 1 to about 24 hours.

11. The process according to claim 1, wherein the nano zeolites are selected from the group consisting of structure types MFI, BETA, FAU and UZM.

12. The process according to claim 1, wherein the step of applying comprises the step of forcing the residuals into the solid portion, the residuals are selected from the group consisting of silica, alumina, silica salts, sodium salts, sodium hydroxide, sodium silicates, sodium aluminates, and mixtures thereof.

* * * * *